Aug. 3, 1926.
H. A. DOUGLAS
1,594,405
AUTOMOBILE SIGNALING APPARATUS
Filed Nov. 3, 1921
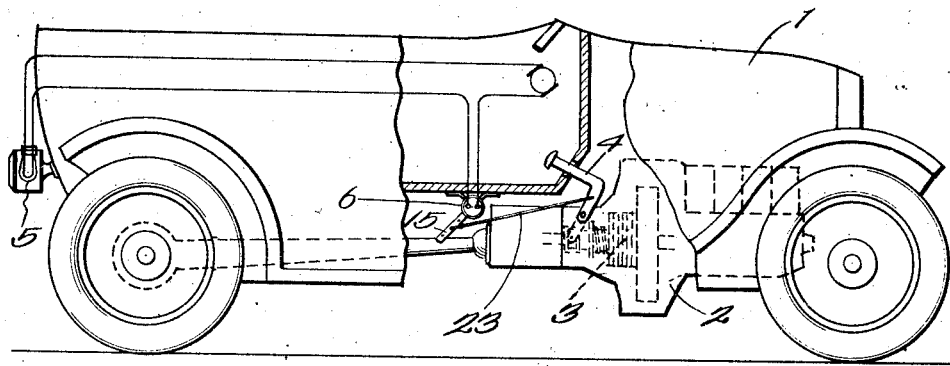
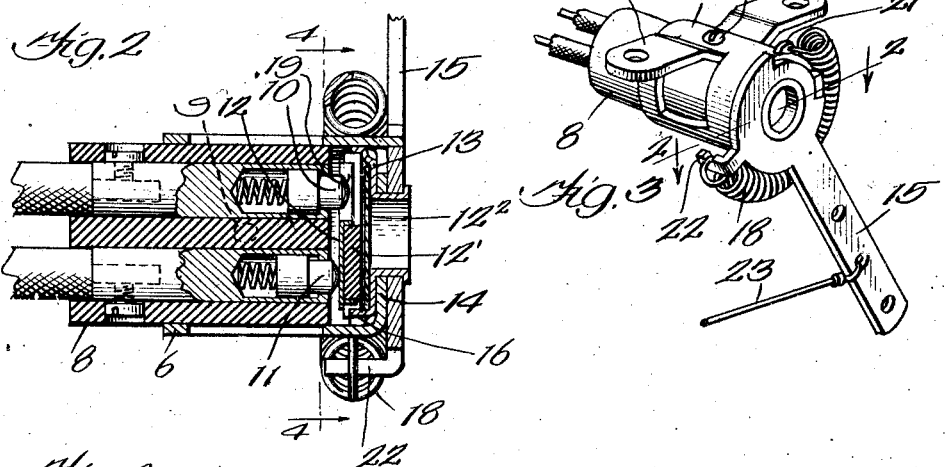
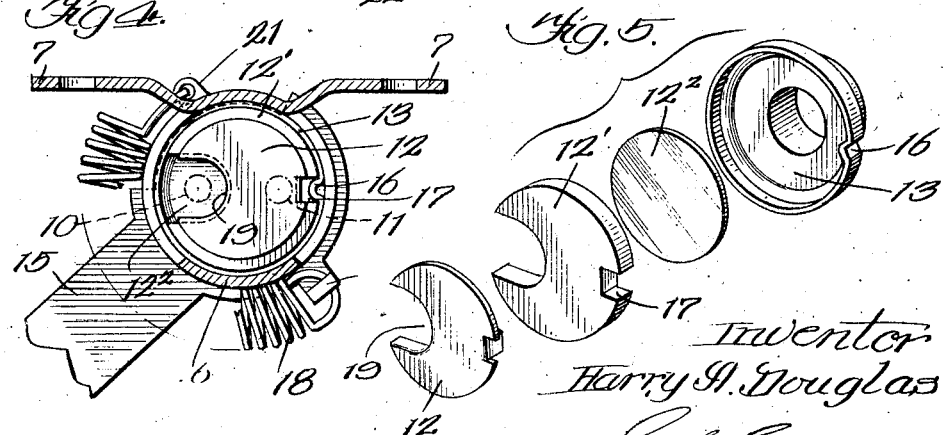
Inventor
Harry A. Douglas
By G. L. Gragg
Atty Patented Aug. 3, 1926.

1,594,405

UNITED STATES PATENT OFFICE.

HARRY A. DOUGLAS, OF BRONSON, MICHIGAN.

AUTOMOBILE SIGNALING APPARATUS.

Application filed November 3, 1921. Serial No. 512,486.

My invention relates to electric switches, a switch constructed in accordance with my invention being of particular service upon an automobile when arranged to be operated by the clutch or other controlling lever thereof to set a stop signal lamp or other electric signaling mechanism that is positioned to be observable from the rear of the motor vehicle.

The structure of my invention includes a shell, a contact carrier coupled with the shell, a spring pressed contact projecting inwardly from said carrier, a conducting plate mounted to turn and formed with an unfilled recess that registers with said spring pressed contact when in one position to open the switch and to be engaged by said spring pressed contact when in an alternative position, a spring operating upon and serving to place the conducting plate in the position in which it is out of engagement with said spring pressed contact, and an operating arm accessible from the exterior of the shell and coupled with the conducting plate and serving to turn it in opposition to said spring to place the plate in the alternative position in which it is engaged by said spring pressed contact. In one embodiment of the invention there is an additional spring pressed contact that constantly engages said plate. The spring, also, is preferably assembled with the shell and arm upon the exterior of the shell, the places of connection of the spring with the shell and the arm being relatively positioned to cause the spring to bear against the shell and assume an arcuate form.

I will explain my invention more fully by reference to the accompanying drawing in which Fig. 1 is a view diagrammatically indicating an automobile and the signaling apparatus of my invention combined therewith; Fig. 2 is an axial sectional view of a switch embracing the invention; Fig. 3 is a perspective view of such switch; Fig. 4 is a sectional view on line 4—4 of Fig. 2; and Fig. 5 is a perspective view of four component parts of the switch in separated relation.

Like parts are indicated by similar characters of reference throughout the different figures.

The motor vehicle 1 may be driven by any suitable form of motor such as an internal combustion hydrocarbon engine diagrammatically indicated at 2. Clutching mechanism 3 is diagrammatically indicated for coupling the motor shaft with the running gear of the vehicle, this clutching mechanism including a clutch releasing lever 4 that is in the form of a pedal which, when actuated, serves to release the clutch and, when released, permits the clutch automatically to couple the motor with the running gear. The signaling mechanism is preferably in the form of an incandescent lamp located at 5 upon the back end of the vehicle to be observable from the rear of the vehicle. The circuit of this lamp is governed by a switch that is to be described and this switch in turn is closed by the clutch lever when operated to release the clutch and is self-opening when the clutch lever is released to permit the clutch to operate.

The switch is inclusive of a shell 6 having ears 7 stamped from the cylindrical wall thereof by which the shell may be suitably attached to the motor vehicle. A contact carrier 8, of insulating material, is suitably assembled with the shell as by means of an assembling screw 9 that is passed through the shell into threaded connection with the carrier. Two spring pressed contacts 10, 11 are carried by the contact carrier 8 and project inwardly from said carrier. The conducting plate 12 which is perpendicular to the contacts 10 and 11, is mounted upon an insulating contact carrier 12' seated within a seat 13 that is journaled to turn in the end wall 14, of the shell 6, that is opposite the contact carrier 8. An operating arm 15 is upon the exterior of the shell and is assembled with the portion of the seat 13 that passes through the end wall 14 and into riveted connection with the arm whereby said seat serves to assemble the arm in rotative connection with the shell. A disc $12^2$ of mica intervenes between disc 12' and the shell wall 14. The seat 13 is formed with an indentation 16 which fits with a corresponding indentation 17 in the carrier 12', this carrier and the contact plate being thus assembled with the seat 13 to turn with this seat and the arm 15. The seat 13 is preferably cup-shaped to surround the plate 12 and its carrier 12'. The rim of the cup-shaped seat is circular and is in rotative engagement with the interior of the shell and may be turned through the influence of the arm 15 when the switch is to be closed or through the influence of the spring 18 when the switch is to be opened. The conducting plate has an air insulating recess 19 which is normally held in register with one of the spring pressed contacts by the spring so that the switch is normally open, the mica disc 12² guarding against short circuiting engagement with the shell wall 14 by this particular spring pressed contact, if it is too long or out of adjustment. The plate 12 is constantly engaged by the other spring pressed contact and is brought into engagement with the remaining spring pressed contact when the seat 13 and the plate 12 therein are moved by the arm 15 against the force of the spring 18. The spring is preferably coiled and has one end connected with a shell at 21 and its other end connected with a lug 22 on the arm, these elements 21 and 22 being upon the exterior of the shell so that the spring may readily be assembled after other parts of the structure have been assembled and may readily be inspected and removed. The location of the parts 21 and 22 is such that the spring will hug the shell and will be given an arcuate form thereby. By placing this spring upon the outside of the shell a "close up" construction is afforded, since no space is required within the shell for the spring.

A switch thus constructed has its arm connected by a wire 23 with the clutch lever 4. When the clutch lever is in idle or clutch releasing position the wire 23 is relieved of tension to permit the spring 18 to turn the seat 13 and the plate 12 therein to a position in which but one spring pressed contact is in engagement with the plate 12. Thus the switch is normally open when the clutch lever is released so that the stop signal lamp upon the rear of the automobile is then out of circuit. When the clutch lever is depressed to release the clutch and uncouple the motor from the running gear of the vehicle it will pull upon the wire 23 and thereby turn the arm 15 to turn the seat 13 and the plate 12 against the force of the switch opening spring 18 whereby the crescent shaped portion of the conducting plate 12 is placed in engagement with both spring pressed contacts. The circuit of the stop lamp is thus closed to warn the driver of any vehicle to the rear of the vehicle equipped with my apparatus that the machine ahead of him is about to slow down or stop.

With the form of switch shown in the drawing the operation of the stop lamp at the rear of the vehicle is made positive and is bound to follow the operation of the clutch lever whenever this clutch lever is actuated to release the clutch preparatory to checking or stopping the vehicle.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

An electric switch including a shell; a contact carrier coupled with the shell; a spring pressed contact projecting inwardly from said carrier; a conducting plate mounted to turn and perpendicular to said spring pressed contact and formed to be free of engagement with said spring pressed contact when in one position and to be engaged by said spring pressed contact when in an alternative position; a coiled spring operating upon and serving to place the conducting plate in the position in which it is out of engagement with said spring pressed contact; and an operating arm accessible from the exterior of the shell and coupled with the conducting plate and serving to turn it in opposition to said spring to place the plate in the alternative position in which it is engaged by said spring pressed contact, the aforesaid conducting plate being assembled with the aforesaid arm and the aforesaid spring being assembled with the shell and arm upon the exterior of the shell, the places of connection of the spring with the shell and the arm being relatively positioned to cause the spring to bear against the shell and assume an arcuate form.

In witness whereof, I hereunto subscribe my name this 1st day of November, A. D., 1921.

HARRY A. DOUGLAS.